United States Patent Office 3,438,516
Patented Apr. 15, 1969

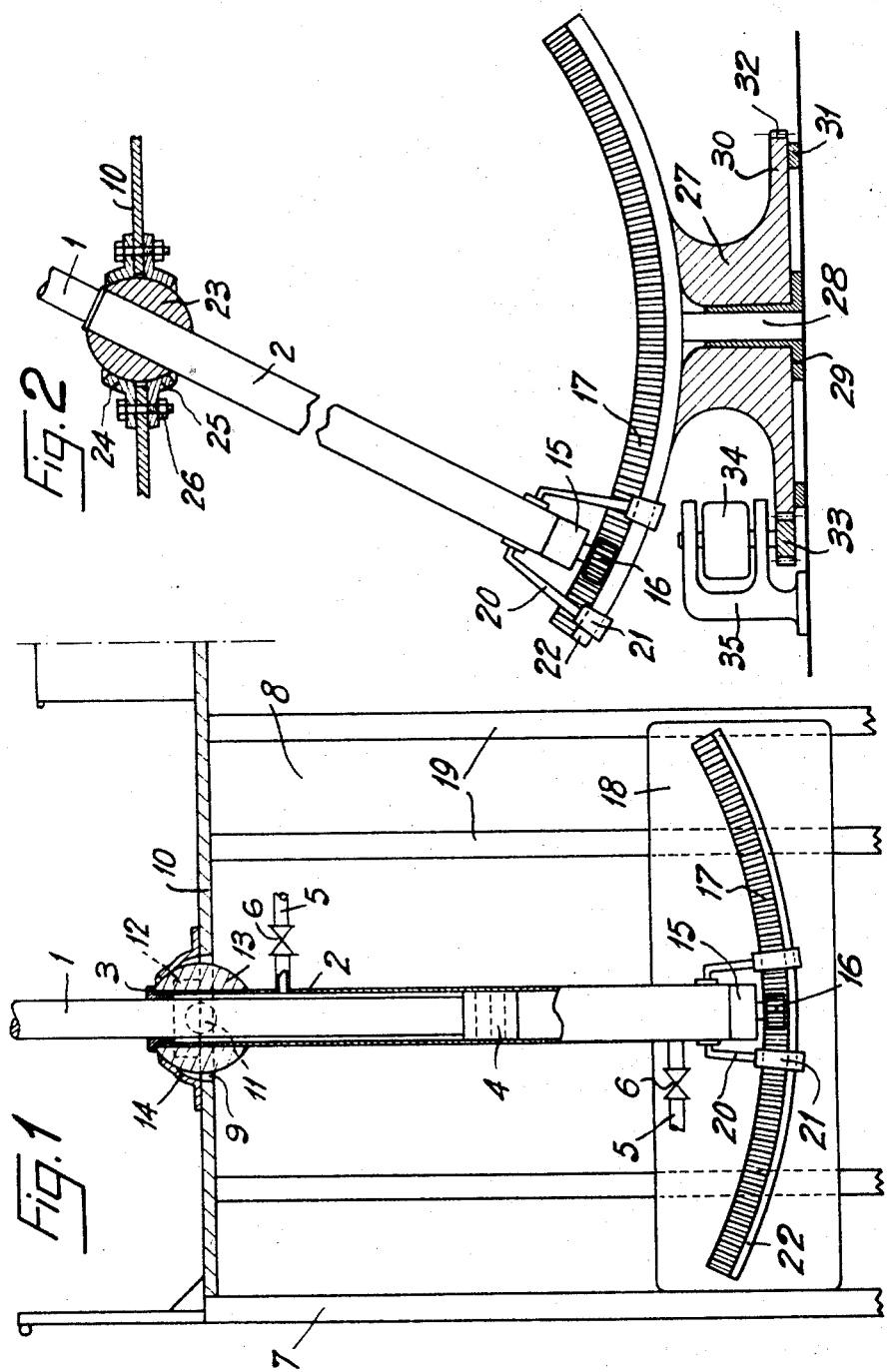

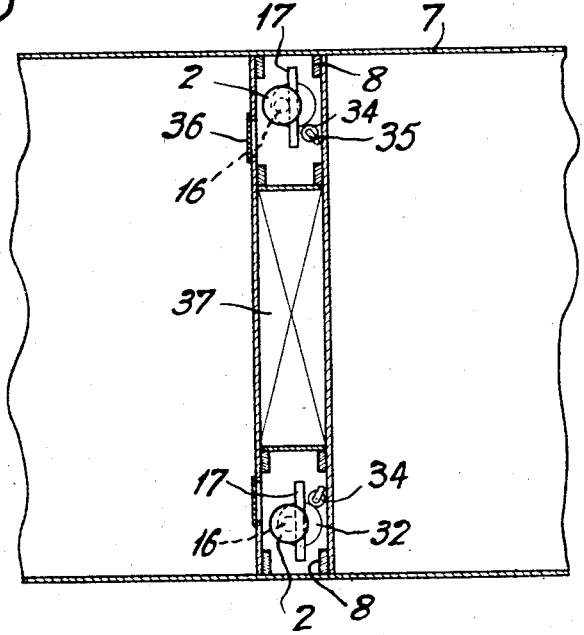
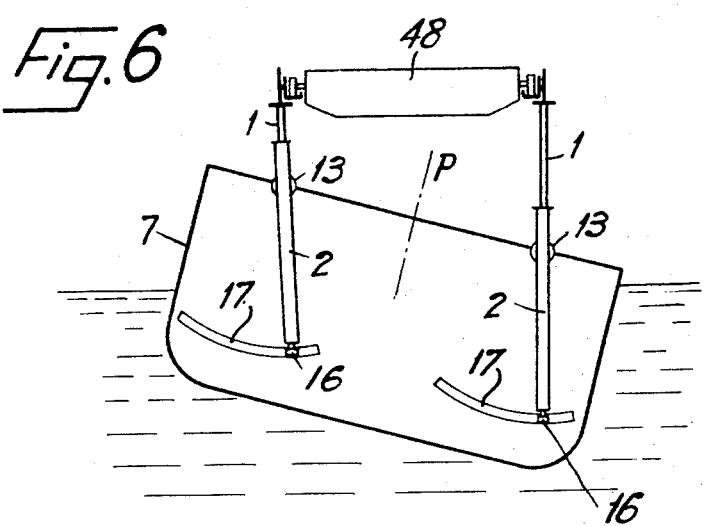

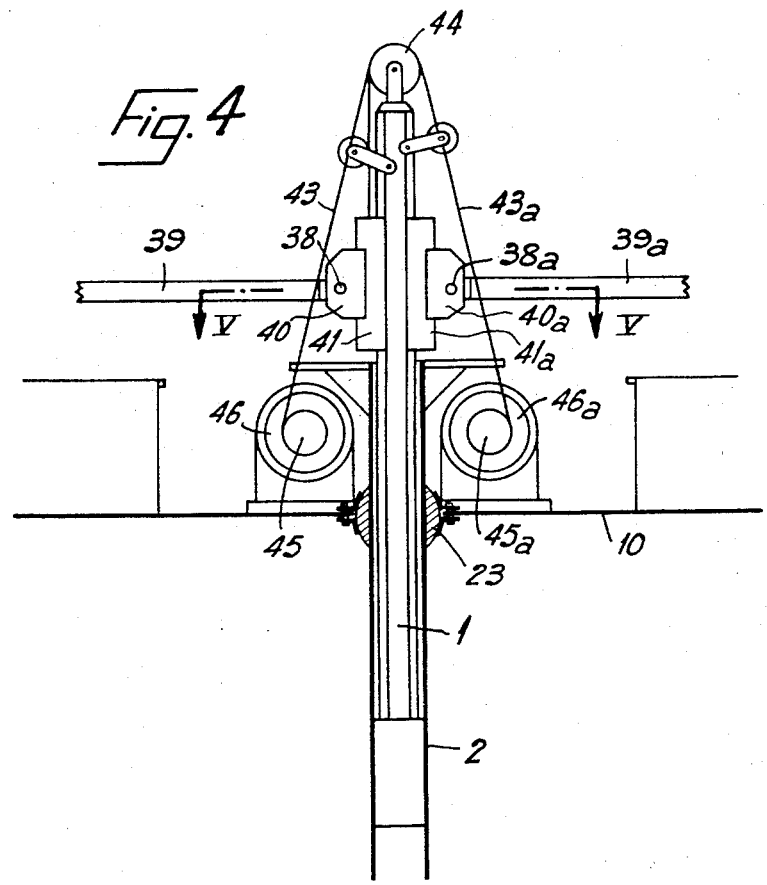
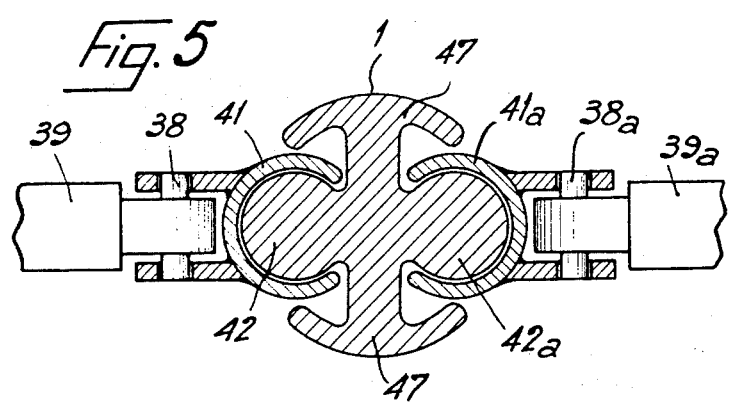

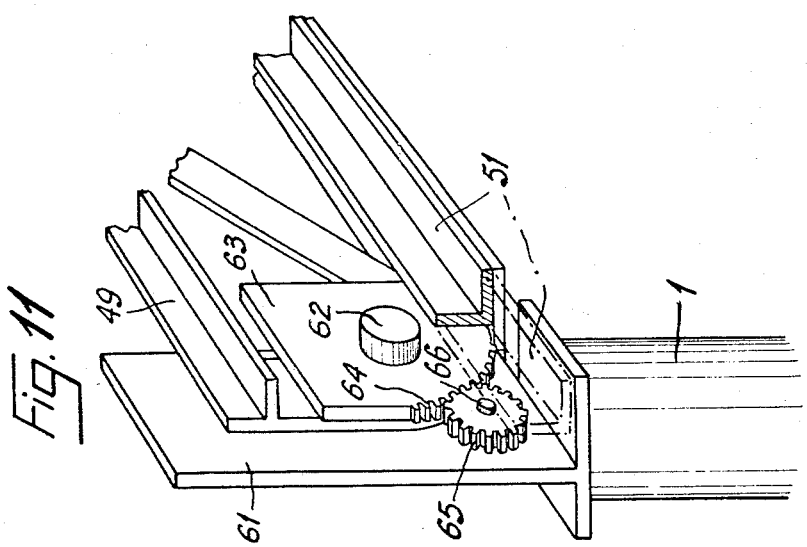
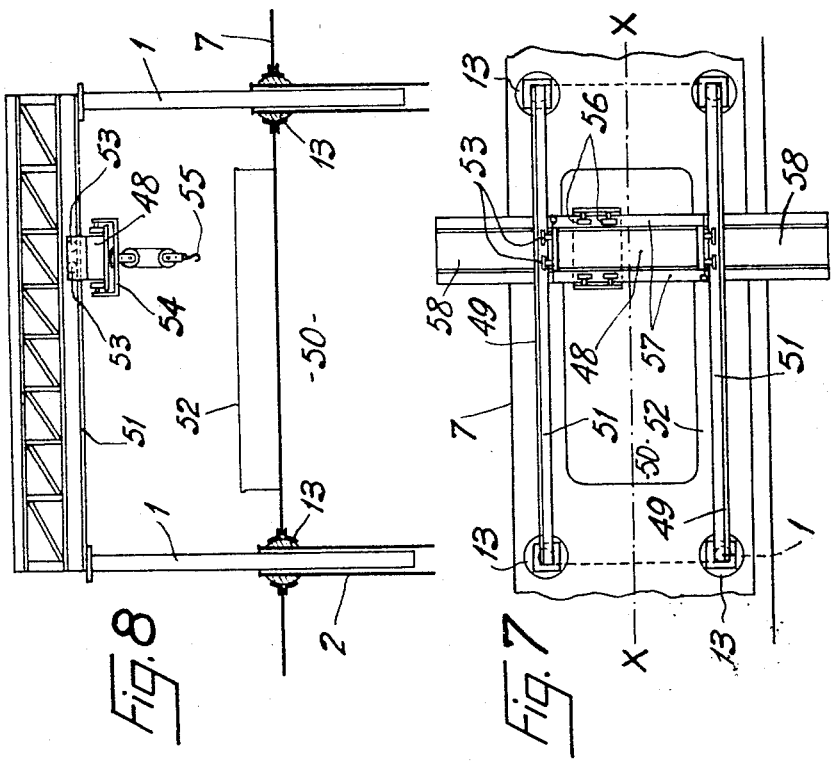

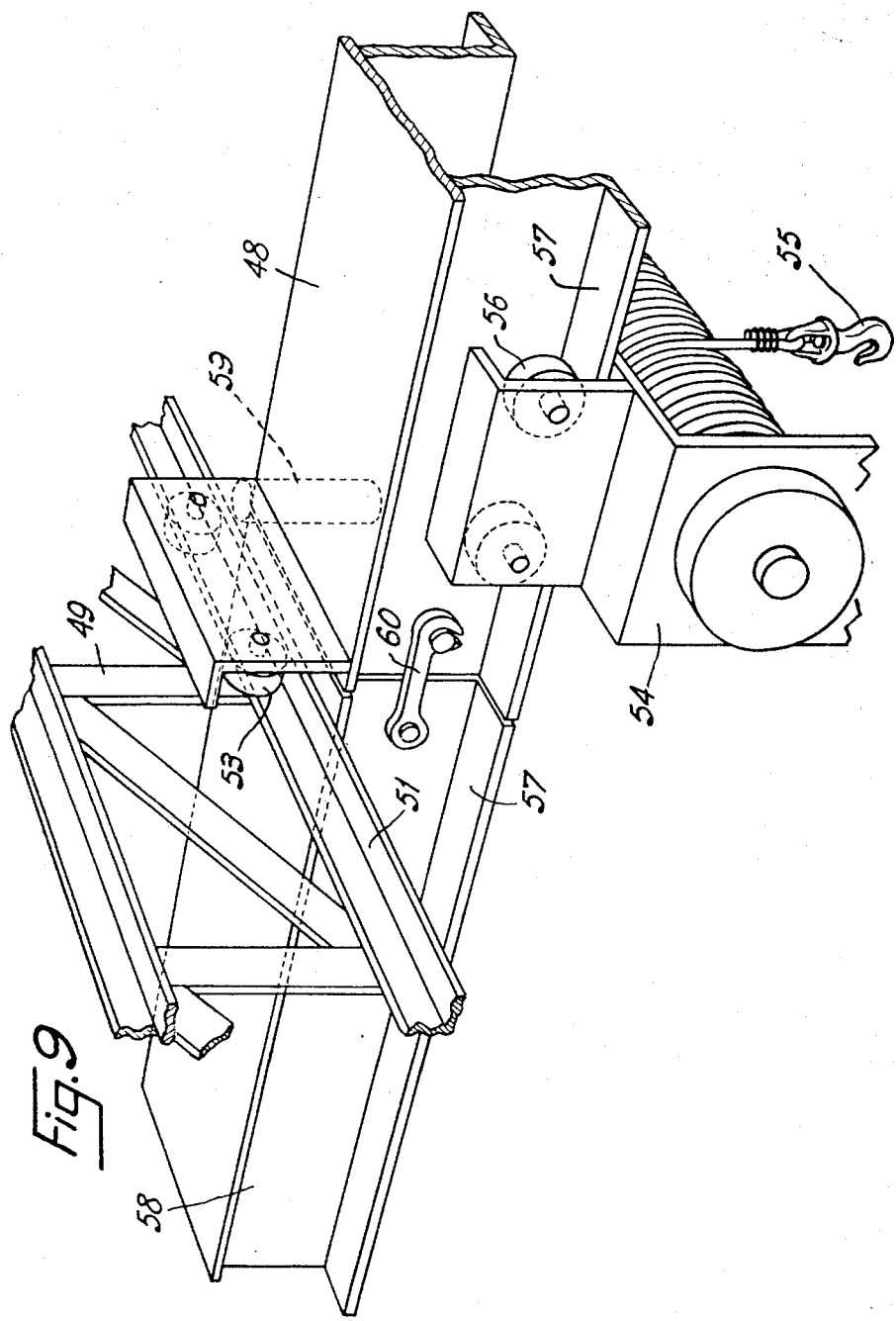

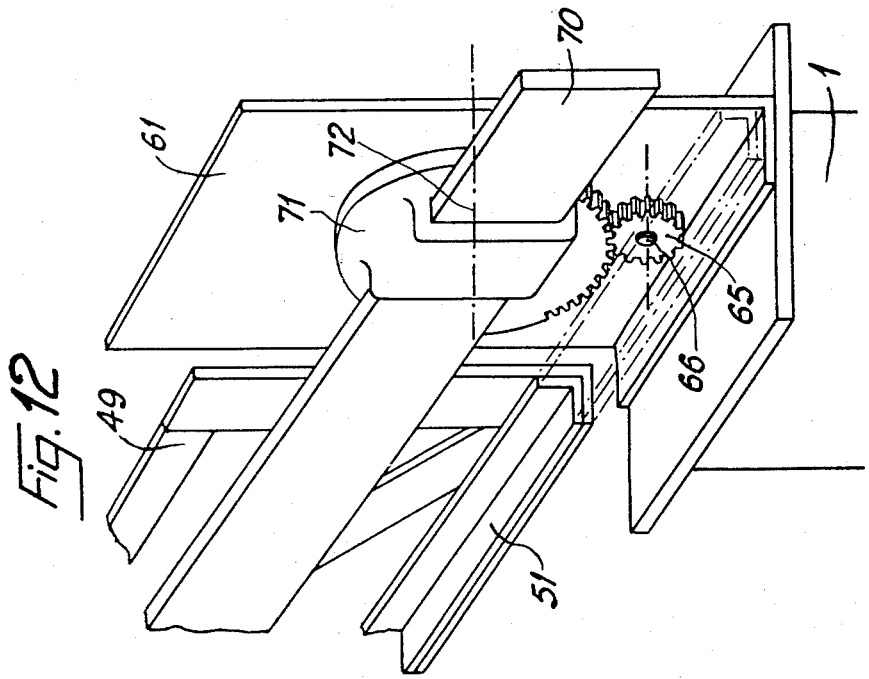
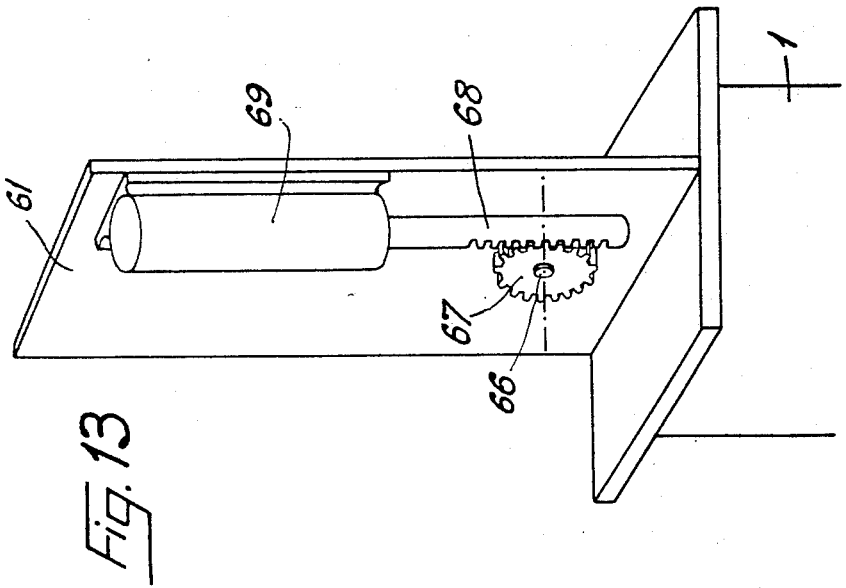

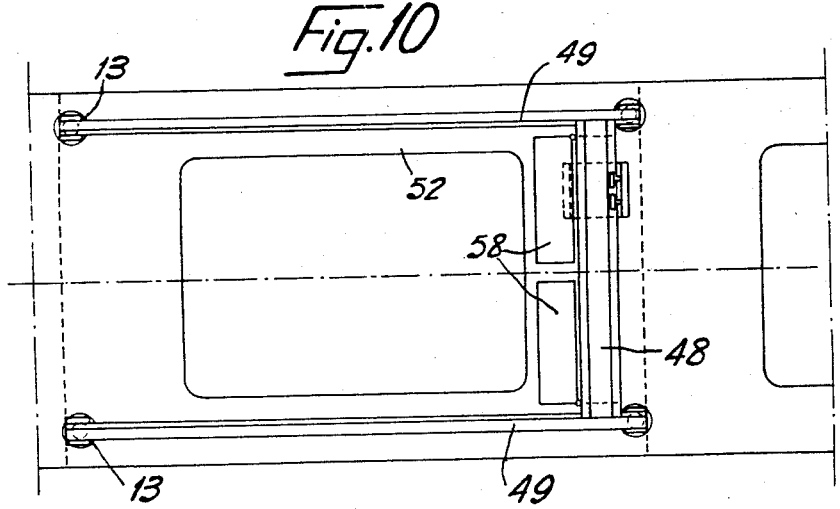
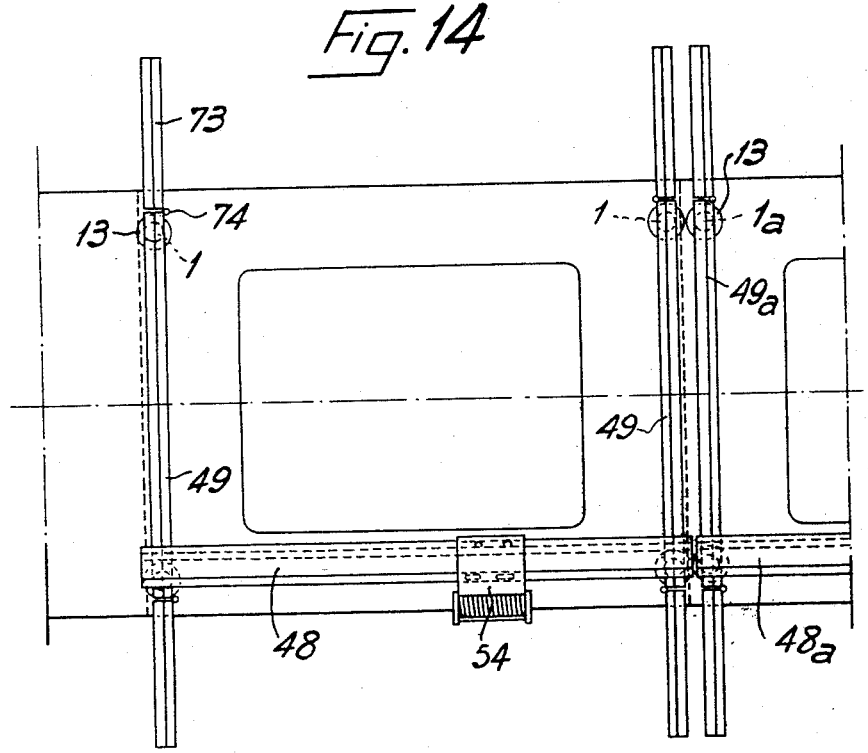

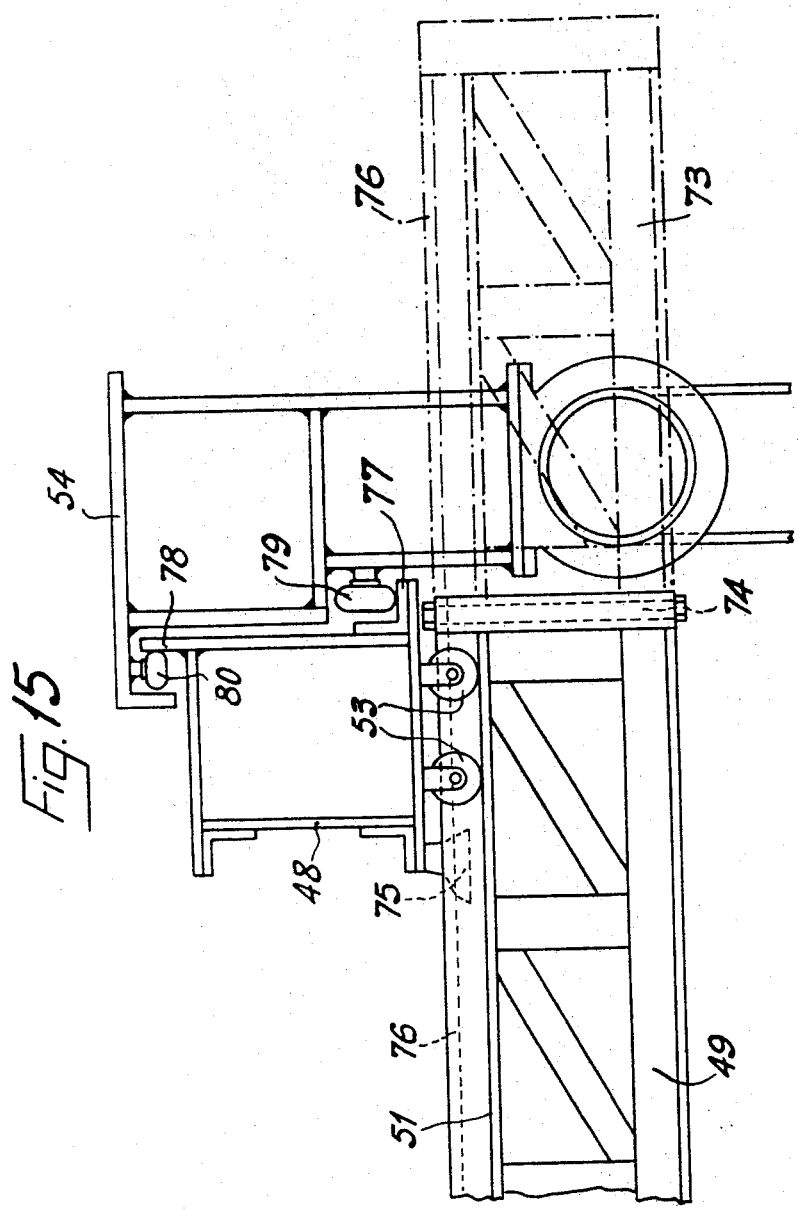

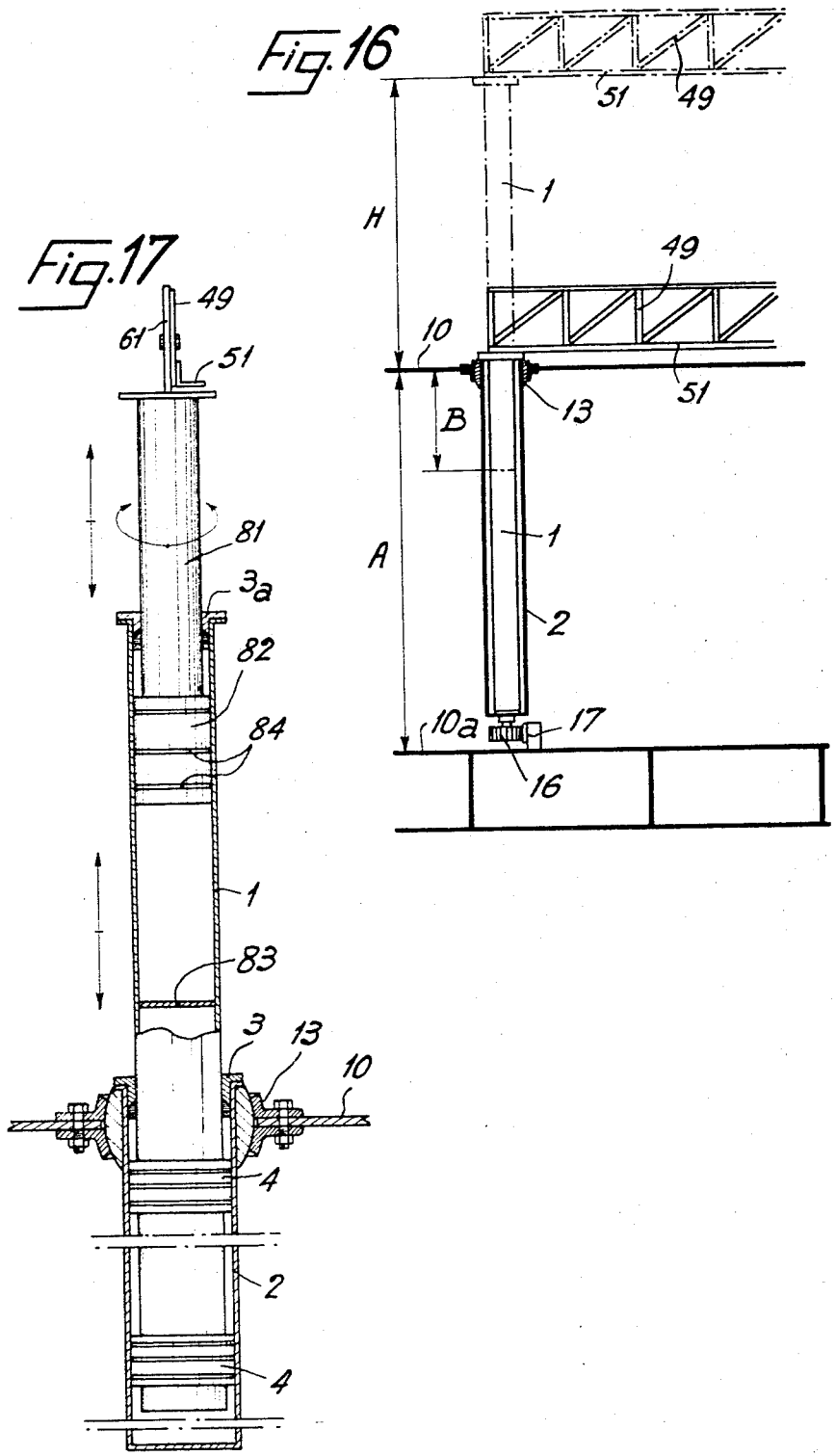

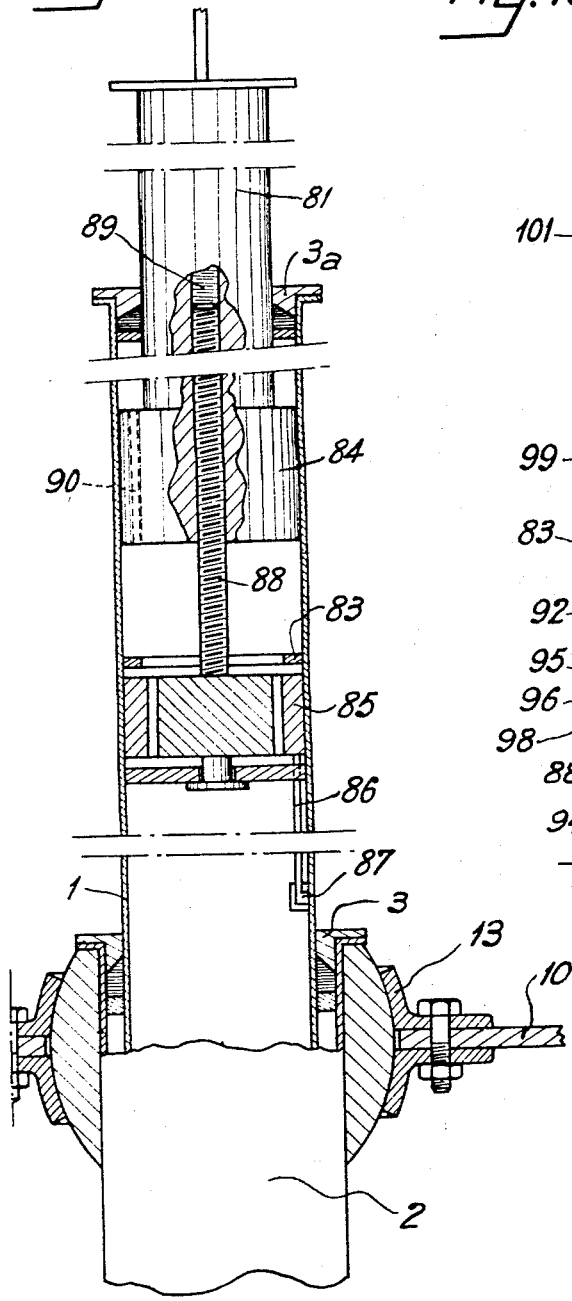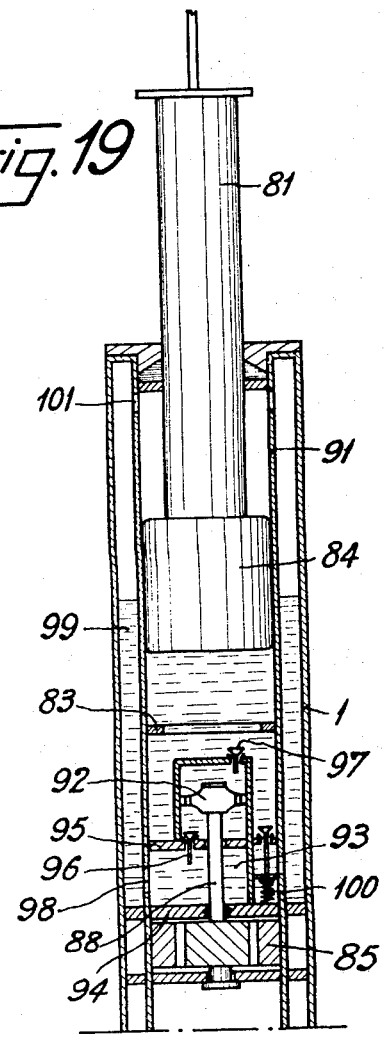

3,438,516
CRANES, DERRICKS AND LIKE CARGO
HANDLING INSTALLATIONS OF SHIPS
Paul Bastide, 108, Rue de Rennes, Paris, France
Filed Nov. 27, 1967, Ser. No. 685,828
Claims priority, application France, Dec. 29, 1966,
89,337; Mar. 28, 1967, 100,461
Int. Cl. B63b 27/04, 27/10
U.S. Cl. 214—15    13 Claims

ABSTRACT OF THE DISCLOSURE

A crane, derrick or the like for loading and unloading cargo in a ship is mounted on one or more telescoping columns the lower end of the or each column being mounted on means below deck level, for example, at the bottom of the hold. The column or columns is or are capable of being pivoted into angular positions so that the crane can be positioned in a substantially horizontal plane irrespective of any listing of the ship.

---

This invention relates to cranes, derricks and like cargo handling installations of ships.

STATEMENT OF PRIOR ART

Crane and derrick installations as at present in use have the disadvantage of constituting superstructures that are inconvenient from the point of view of navigation, behaviour of the vessel in stormy conditions, and the effect on the centre of gravity of the ship.

In order to obviate these drawbacks, it has been proposed to fix the hatch panels of the vessel to telescopic posts positioned at the four corners of the hatch and to install a travelling crane below the panel. Such an arrangement is not free from drawbacks, among which might be mentioned the space occupied by the travelling crane in the hold when the hatch is closed, and the presence of the posts at the four corners of the hatch right in the middle of the hold.

It has also been proposed to provide the vessel with a double hull, doing away with the deck, and to equip it with a travelling crane moving on rails supported by telescopic columns disposed between the two walls of the hull. This calls for a special construction of ship, difficult to apply in the case of ocean-going vessels.

It has also been proposed to equip a ship with travelling cranes which can be rested on the deck when not in use, the posts supporting these travelling cranes being fixed or even collapsible on the deck. Such an arrangement results in a large superstructure on the deck.

Apart from these specific drawbacks, the known installations have the disadvantage that the hoisting gear cannot be adjusted to the horizontal position, which problem often arises since the vessels may take on a list during loading and unloading.

SUMMARY OF INVENTION

The present invention enables this problem, among others, to be resolved because of the fact that the hoisting gear of the cargo-handling installation of the ship is supported by one or more telescopic columns, the bottom element of which, located over its larger part below the level of the deck of the vessel, is pivoted in such manner that its inclination relative to the deck can be varied.

The pivotal movement can be about a single axis, preferably longitudinal or transverse of the vessel.

The pivoting means may also be of the universal type, that is to say pivoting can take place in all directions by means of a ball and socket joint mounting.

Where possible, the column or columns are set up close to the ship's sides and along a bulkhead of the vessel, so as to cause the minimum of inconvenience in the hold and to enable the hoisting gear to be collapsed flush with the deck, between two hatch panels.

If necessary, they may also be located, together with the means for inclining them, between two parallel bulkheads, the space between the bulkheads that they do not occupy being used, for example, as a reservoir for liquids such as water, fuels, etc.

The invention may be applied to all types of hoisting gear (derricks, gantry cranes, travelling cranes, runway cranes, etc.). In the case of derricks comprising only one upright, means may be provided for adjusting not only the height of the upright, but also that of its arms above the deck.

In the case of cranes supported on several columns, such as travelling cranes, means can be provided for bringing the tracks into a horizontal position and for compensating the differences in length due to variations in the inclination of the columns.

Furthermore, the columns can be made of more than two telescopic parts, three for example, and means requiring no projecting parts on the elements forming the columns can be advantageously used to ensure that said elements can be readily extended and retracted.

Apart from the advantages accruing from the possibility of moving the hoisting installation almost completely out of the way when it is not in use, mention must be made of the advantage that resides in the fact that said installation can be used when, for example, it comprises gantries or travelling cranes, for stowing a cargo on the deck, for example, crates, timber, etc., the columns securing the cargo laterally and the cross-members and overhead runways bearing down upon it from above.

The following description relating to the annexed drawings and given by way of example, will clearly show how the invention may be carried into effect. In the drawings:

FIGURE 1 is a schematic view, partly in section, of a pivoted telescopic column according to one embodiment of the invention;

FIGURE 2 is a view, partly in section, illustrating the mounting of a column, similar to that shown in FIGURE 1, by means of a ball and socket joint;

FIGURE 3 is a schematic sectional view showing how columns may be mounted between two transverse bulkheads of a vessel;

FIGURE 4 is a schematic view, partly in elevation and partly in section, showing how the invention may be applied to a derrick;

FIGURE 5 is a section on the line V—V of FIGURE 4;

FIGURE 6 is a schematic view illustrating the application of the invention to a travelling crane;

FIGURE 7 is a plan view;

FIGURE 8 is a schematic sectional view showing a travelling crane with rails disposed longitudinally relative to the vessel, the crane being equipped in accordance with the invention;

FIGURE 9 is a fragmentary view on an enlarged scale and in perspective showing the collapsible extention of the travelling crane;

FIGURE 10 is a view similar to that of FIGURE 7, but showing the extensions in the collapsed position;

FIGURE 11 is a fragmentary view showing the pivoting of a beam of the travelling crane on one end of the column;

FIGURE 12 is a view similar to FIGURE 11, showing the pivoting arrangement at the other end;

FIGURE 13 is a view showing the mechanism provided behind the support plate fixed to the column;

FIGURE 14 is a view similar to that of FIGURE 7 but showing a travelling crane with transverse rails;

FIGURE 15 is a part elevation on an enlarged scale showing the arrangement of the winding-drum carriage of the travelling crane of the kind shown in FIGURE 14;

FIGURE 16 is a schematic view illustrating the drawbacks of a column system comprising only two telescopic parts;

FIGURE 17 is a sectional view of a column comprising three telescopic elements;

FIGURE 18 is a fragmentary view in longitudinal section and on an enlarged scale, showing means for extending or retracting the column; and FIGURE 19 is a view similar to FIGURE 18, and showing a hydraulically actuated column.

As illustrated in FIGURE 1, a column 1, forming part of a hoisting mechanism which may be a derrick, a gantry, a travelling crane, a runway crane, etc., is fitted telescopically in a cylinder 2 in which it is guided by a gland 3 and a piston 4. Flexible piping 5, fitted with cocks 6, is adapted to supply fluid pressure to effect the reciprocating movement of the column in the cylinder.

The cylinder 2 is fitted in the hold of the ship 7, adjacent to a transverse bulkhead 8 so as to cause the least inconvenience possible in the hold.

At its upper end, the cylinder passes through an opening 9 in the deck 10. Journals 11 extend from the cylinder longitudinally of the vessel and are mounted in bearings 12, provided on the deck. At its upper end, the cylinder 2 is provided with a spherical member 13 cooperating with a fluid-tight hood 14 of resilient material, fixed to the deck and adapted to provide a good seal with the member 13.

At its lower end, the cylinder 2 carries a hydraulic or electric motor 15, driving a pinion 16 meshing with an arcuate rack 17 disposed concentrically with respect to the spherical surface of the member 13 and mounted on a plate 18 fixed to uprights 19 of the hold bulkheads 8. On each of two opposed sides of the cylinder 2, at its lower end an arm 20 is provided terminating in a stirrup 21 provided with a shoe engaging a guide track 22 parallel with the rack.

By rotating the pinion 16, the cylinder 2 and the column 1 can be moved to extend at an angle relatively to the vessel 7. Generally, this inclination is never very great and, in practice, would not exceed 15° to 20°.

The adjustment of the inclination of the column 1 is to enable it to be maintained in a vertical position irrespective of any listing of the ship. Particularly in the case of a travelling crane, it is also possible to prevent certain rolling movements of the hoisting gear from occurring when in an inclined position and when the vessel is listing or raked.

If desired, the inclination of the column 1 may be adjusted in a direction longitudinally of the ship by means similar to those described with reference to FIGURE 1, assuming that there is space above and below deck to permit such movement.

The embodiment shown in FIGURE 2 relates to a mounting which enables the cylinder 2 and column 1 to be inclined in any direction relatively to the deck of the vessel.

As shown, the upper end of the cylinder 2 has a spherical element 23 mounted between two part-spherical shells 24 and 25 fixed on the edge of an opening in the deck by means of bolts 26.

In this way the column can be positioned vertically whatever the slope of the vessel, whether the ship be raked (longitudinally inclined) or listed (transversely inclined).

As in the case of FIGURE 1, the cylinder 2 has a pinion 16 at its lower end driven by a motor 15 and meshing with a rack 17 with which it is held in engagement by arms 20 and stirrups 21 having shoes engaging the track 22. The rack 17 has an integral pedestal 27 which can rotate on a pivot 28 mounted in a bearing 29.

The axis of the pivot 28 is vertical when the vessel is trimmed and so positioned that the column is vertical when the cylinder 2 has been brought to the lowest point on the rack.

The pedestal 27 has a circular flange 30 concentric with the pivot 28 and resting on slide shoes 31. The flange 30 is provided with a series of teeth 32 which mesh with a pinion 33 driven by a motor 34 carried on a frame 35. By suitably linking the driving of the pinions 33 and 16, the column can be set in any required position.

In the case of hoisting gear incorporating several supporting columns, the means for effecting the inclination of the columns and for raising and lowering them are, of course, suitably coupled and connected so as to bring the hoisting gear into the required position of use.

In order to prevent the columns and parts associated with them from consting troublesome obstacles in the hold of the ship 7, it is possible, as shown in FIGURE 3, to position one or more columns in a space bounded by two tranverse bulkheads 8 (or two longitudinal ones) suitably spaced apart.

Advantageously, the bulkheads have smooth faces presented to the holds, to enable the vessel to be loaded with crates or containers. The spaces reserved for the columns are provided with inspection traps 36. Beyond said spaces, the bulkheads 8 can contain reservoirs 37 for water, fuel, etc. The presence of such reservoirs enables the dimensions of double bottom of the boat to be reduced and therefore the stability therof to be increased, the load as a whole being reduced.

When the hoisting gear comprises a derrick, the present invention offers a possibility not only of regulating the height of the derrick itself, but also that of the arms associated therewith. Such a possibility is of interest particularly in the handling of loads in a port where the difference in tide levels is great, and also in the case of very voluminous loads.

The application of the invention to a derrick is shown in FIGURES 4 and 5, and as shown fittings 38 and 38a on arms 39 and 39a are mounted on fork members 40 and 40a integral with shoes 41 and 41a of part-cylindrical form and engaging complementary guides 42 and 42a on the column 1. These guides are formed within the general circular cross sectional outline of the column 1 so as not to interfere with the retraction and extension movements of the column.

The raising and lowering movements of the arms are effected by means of ropes 43 and 43a passing around a pulley 44 provided at the top of the derrick and attached at one end to the shoe in question and at the other to the hubs 45, 45a of winding-drum 46, 46a.

The column 1 is rendered rigid by means of T-shaped lateral ribs 47 disposed on each side of the guides 42 and 42a. The shape of the column 1 could be simplified by fitting the shoes 41 and 41a one above the other.

FIGURE 6 illustrates the application of the invention to a transverse travelling crane 48.

Since, except in special circumstances, the length of the travelling crane 48 is constant as is the distance separating the two pivotal points 13, situated on each side of the median plane P of the vessel, it is not possible to keep the columns absolutely vertical if the ship is inclined and the columns are adjusted to render the travelling crane 48 horizontal. This drawback is reduced by inclining the cylinders 2 at slightly different angles to one another. The departure of the columns from the vertical always remain minimal, so that the bending stresses occurring are more greatly reduced than if the columns inclined with the ship. It is, however, possible to obviate this drawback completely and to leave the columns absolutely vertical by using, for the travelling crane or the beams 49 on which the latter moves (according to whether the travelling crane extends longitudinally or transversely of the ship), a means for adjusting their length. This is described in the present specification in connection with FIGURES 11 to 13.

In the embodiment illustrated in FIGURES 7 to 13, the hold of the vessel 7 is served by a travelliing crane 48 the tracks 51 of which are each supported by lateral beams 49 extending in a plane which is parallel with the longitudinal plane of symmetry XX of the vessel (FIGURE 7). The tracks are disposed on either side of the hatch opening 52.

The beams 49 are supported by vertical columns 1 movable in cylinders 2 similar to the embodiments previously described.

As can be seen from FIGURES 7 and 8, the travelling crane 48 is positioned below the longitudinal beams 49 and it can move along the tracks 51 on rollers 53. The crane incorporates a winding-drum carriage 54 which moves on rollers 56 on the tracks 57 of the overhead support 58. A rope having a hook 55 is wound on the drum.

To enable loads to be moved from the ship to the dockside and vice versa, the travelling crane 48 is adapted to overhang both sides of the vessel. The overhanging ends of the support 58, as shown in FIGURE 9, can also be moved inwards so that the overhead support can be passed between the columns 1. For this purpose, each of the ends of the support 58 is articulated on the rest of the overhead crane and turns on a lateral vertical hinge 59, a locking means 60, incorporating a hook being provided to hold said ends in the correct position when they constitute extensions of the overhead support 58.

FIGURE 10 shows the ends of the overhead support 58 folded back for the purpose either of parking the travelling crane in the minimum of space on the deck of the ship, or of passing the travelling crane from one hold to the next.

If the deck of the ship is horizontal, the simultaneous actuation of the columns 1 enables the travelling crane to be brought to the required height above the vessel with its tracks horizontal. When the vessel is not horizontal, the columns are raised to different heights so as to position the crane substantially horizontally.

FIGURES 11 to 13 show mechanisms whereby the tracks may be brought to the horizontal, while balancing out the differences in length that may occur.

One of the ends of each of the beams 49 is articulated (FIGURE 11) on a head-piece 61 carried by the column 1, so as to pivot about a horizontal pivot 62, a reinforcing plate 63 being fixed to the web of the beam 49. This plate has a toothed portion 64, coaxial with the pivot 62 and meshing with a pinion 65 keyed to a shaft 66 which passes through the head-piece 61.

On the opposite side of this head-piece (FIGURE 13), the shaft 66 has a pinion 67 secured thereto, which pinion meshes with a rack 68 which is actuated by a jack 69. This mechanism enables the beam to be inclined relatively to the column and at the same time enables it to be locked in the position into which it has been adjusted.

FIGURE 12 shows how the other end of the beam 49 may be mounted so that it can be inclined, while enabling the columns to be kept parallel with each other.

Firmly connected to the beam is a longitudinal bar 70 which can slide in a guideway of a plate 71 pivoting about an axis 72. The plate 71 has a toothed portion which is concentric with the axis 72 and meshes with a pinion 65 keyed on a shaft 66 as in the case of the plate 63 at the other end. The shaft 66 forms part of a mechanism comprising a jack, a rack and pinions and of the kind illustrated in FIGURE 13, and for the purposes already indicated.

In order, where necessary, to be able to move the travelling crane from one hold to the next, it is possible to raise the columns of the two holds in such a way that the respective beams 49 form extensions of each other.

It is thus possible to lift heavier loads or more loads. If necessary, the hoisting gear can be held firm by means of guys fitted with turnbuckles.

The adjacent beams 49 can be kept strictly in the position in which the one forms an extension of the other, by means of a locking means which comprises, for example, shoes made of a hard and oily wood such as guaiacum, and carried on brackets fixed to the columns. When the shoes have reached a position in which they are opposite each other, the two columns are locked by means of a jack carried on one of the brackets, the rod of the jack engaging in a socket provided on the opposite bracket.

In the embodiment shown in FIGURES 14 and 15, the travelling crane 48 is disposed longitudinally of the vessel. In this case, it is the beams 49 that are positioned transversely, these again being supported by the column 1 and comprising folding extensions 73 articulated at 74 so that the travelling crane can be moved to a position above the dockside.

The folding back of these extensions also enables the winding-drum carriage of one of the travelling cranes, for example, crane 48, to be moved along the overhead support 48a of the neighbouring span, after adjusting the height of the columns 1 and 1a, and if necessary, the inclination of these columns, and after bringing the travelling cranes to the horizontal position.

To enable these movements to be carried out without the columns getting in the way, the travelling cranes are this time disposed above the beams 49 and 49a and their carriages 54 are overhung as shown in FIGURE 15.

The crane moves on its rollers 53 along the tracks 51 on the beams 49 and it is protected against the danger of rocking by means of the shoes 75 which engage beneath the rails 76 provided above each track, both on the central portion of the beams and on their extensions 73.

The overhead support has two tracks, a horizontal one 77, situated on the side opposite to that carrying the shoes and, a vertical one 78 on the upper portion.

The carriage 52 has two sets of rollers, the one set 79, having horizontal shafts, moving along the track 77, and the other set 80, having vertical shafts, moving along the vertical track 78.

The links 74 for the fold-back extensions 73 are disposed in such a way that no obstacle opposes the movement of the carriage when these extensions are folded back.

As shown in FIGURE 16, A designates the distance separating the deck 10 of the vessel and the top 10a of the ballast in the hold and the length of the column 1 that can be retracted into its guide tube 2 is at most equal to A.

However, when for example, the beam 49 along which the travelling crane moves, is brought to the top position, the column 1 cannot be fully extended since, for the gear to be stable, it is necessary for this column to remain engaged within its cylinder 2 over a certain length B.

It follows that in the top position, the vertical distance H available between the track 51 and the deck 10 is reduced and less than A–B: this disadvantage is still more pronounced when the vessel is inclined since the columns must be extended over different lengths.

Such reduced vertical distance can be considered sufficient in many cases, but if it is desired to have a greater vertical distance available, as shown in FIGURE 17, the upper part of the column 1 can be fitted with an additional element in the form of a telescopic extension-piece 81 sliding, preferably by a portion 82 forming a piston, within the column 1 and between a lower stop 83 and a gland 3a. The piston 82 may, if necessary, have sealing rings 84.

The extension piece 81 carries the beam 49 which supports the track 51. It is thus possible to increase the vertical distance by the length over which the extension-piece slides. The latter element may also rotate about its own axis, at least within certain limits, and this offers important advantages.

The sliding movement of the extension-piece 81 has to be carried out in such a way that no part of said extension-piece projects therefrom, so as not to interfere with the sliding of the column in the tube 2.

FIGURE 18 shows electrically controlled actuating means which meet these conditions.

Below the stop 83 there is fitted an electric motor 85 supplied through conductors 86 and a socket 87 situated at the bottom of the free part of the column 1 above the deck when this column is moved out of its cylinder. The stator of the motor is mounted on the column whilst the rotor drives a threaded shaft 88 either directly or through the intermediary of a reduction gear, for example, a coaxial epicycloidal gear, the extension-piece 81 engaging on said threaded shaft by means of a suitable tapped portion 89. The beam 49, or some other suitable means, prevents the extension-piece 81 from turning and, under these conditions, when the motor is started up, the extension-piece 81 is raised or lowered to the required extent.

In practice, the column 1 is first moved out of its cylinder to an extent that renders the socket 87 accessible and this socket is then plugged into a suitable electrical supply. When after use the extension-piece 81 has been retracted into the column, the plug is removed and the column 1 can in turn be retracted. In order to prevent air pressure from interfering with the movement of the guide piston 84, channels or grooves 90 are provided in the latter, or air-holes can be provided at the two ends of the extension-piece.

The socket 87 is preferably covered by a tight fitting cover which does not project and which may be attached to the column, for example, by screws.

In the embodiment shown in FIGURE 19, the column 1, which is double-walled, houses an electric motor 85 in its inner tubular body 91, and the shaft 88 of this motor drives a pump 92. The latter drives in fluid such as oil contained in a lower compartment 93 bounded by partitions 94 and 95, the fluid passing through a valve 96 and then being forced through a valve 97 under the piston 84 of the extension-piece 81.

The compartment 93 communicates through orifices 98 with the annular space 99 formed between the two walls of the column 1 so that oil in the space 99 can flow into the compartment 93.

The downward movement of the extension-piece moves by gravity after an electromagnetically controlled valve 100 has been opened. The motor 85 and the valve are supplied with current by means of sockets similar to the socket 87 described in the previous example.

Air-holes 101 are provided in the upper part of the inner wall of the column 1.

Instead of the electric motor 85 described in the embodiment of FIGURE 18, a closed circuit hydraulic system similar to that described with reference to FIGURE 19 could be used for raising and lowering the column 1. Compared with the system described in connection with FIGURE 1, these methods offer the advantage of dispensing with outside pipework as well as with the connections between this pipework and the cylinder 2; also the problem of storing the actuating fluid can be solved or considerably simplified, since when used, the fluid remains enclosed in the cylinder 2.

I claim:
1. A ship having a crane for loading and unloading cargo, at least one telescoping column mounted in the ship and having means at an upper end for supporting said crane and a lower end supported in the ship, means for supporting said lower end at a position below deck level, pivot means mounting an intermediate portion of said column on the ship and means for pivoting said column about said pivot means into different angular positions relative to the vertical by force applied to the lower end of the column whereby to mtaintain the crane level as the ship lists.

2. A structure as claimed in claim 1, wherein the axis of the pivotal movement of said column is perpendicular to the said mounting of the lower end of the column.

3. A structure as claimed in claim 1, wherein the column is located adjacent a bulkhead in the ship.

4. A structure as claimed in claim 1, wherein the said mounting for the lower end of said column permits universal pivotal movement of said column.

5. A structure as claimed in claim 1, wherein said column is mounted between two parallel bulkheads of the ship.

6. A structure as claimed in claim 1, wherein the means for effecting said pivotal movement comprises a pinion on said lower end of said column meshing with a rack and driven by a motor.

7. A structure as claimed in claim 6, wherein said rack is carried on a support which is rotated about an axis parallel with that of the column when the latter is in its vertical noninclined position.

8. A structure as claimed in claim 1, wherein the crane is in the form of a derrick having load carrying arms attached to said column.

9. A structure as claimed in claim 1, wherein the crane is mounted for movement along tracks, the crane being supported on two said telescoping columns which are adjustable in height independently of one another.

10. A structure as claimed in claim 9, wherein the columns support a beam along which the crane is adapted to be moved, means being provided for moving said beam in a vertical plane relatively to said columns.

11. A structure as claimed in claim 10, wherein the beam is articulated to one of said columns and is slidable in a support which can rotate relatively to the other column, means being provided for adjusting the inclination of the beam and for locking it in adjusted position.

12. A structure as claimed in claim 1, wherein the telescoping elements of the column are hollow, a motor for effecting the axial movement of the telescoping elements being housed in said hollow column.

13. A structure as claimed in claim 12, wherein the telescoping elements are moved by hydraulically actuated means including a pump housed in one of the hollow elements, a reservoir for hydraulic fluid to be fed by said pump being provided in a compartment in said hollow element.

References Cited

UNITED STATES PATENTS 3,390,654   7/1968   Bromell et al. _____ 114—5

FOREIGN PATENTS 200,970   7/1923   Great Britain.

GERALD M. FORLENZA, *Primary Examiner.*

F. E. WERNER, *Assistant Examiner.*

U.S. Cl. X.R.

114—121; 212—3